United States Patent [19]

Mihailov

[11] Patent Number: 4,852,643

[45] Date of Patent: Aug. 1, 1989

[54] VACUUM CONDENSOR WITH CONDENSATE CATCH

[75] Inventor: Mihail V. Mihailov, Sofia, Bulgaria

[73] Assignee: Kombinat "Korabostroene", Varna, Bulgaria

[21] Appl. No.: 155,304

[22] Filed: Feb. 12, 1988

Related U.S. Application Data

[62] Division of Ser. No. 935,858, Nov. 26, 1986, Pat. No. 4,726,418.

[51] Int. Cl.$^4$ .............................................. F28B 9/10
[52] U.S. Cl. .................................. 165/113; 165/166; 165/913
[58] Field of Search ................ 165/113, 114, 913, 166

[56] References Cited

U.S. PATENT DOCUMENTS

| | | | |
|---|---|---|---|
| 3,538,983 | 11/1970 | Thomae | 165/113 |
| 3,797,565 | 3/1974 | Fernandes | 165/113 X |
| 4,182,411 | 1/1980 | Sumitomo et al. | 165/166 X |

Primary Examiner—Margaret A. Focarino
Attorney, Agent, or Firm—Herbert Dubno

[57] ABSTRACT

A vacuum condensor with condensate catch, consisting of a horizontal cylindrical housing with neck, the both bottoms of which are closed by covers, and inside the housing there are mounted heat-exchange bodies, while externally to it there are connected a deaeration device and a condensate pump. The heat-exchange bodies can be either pipes or plates.

2 Claims, 2 Drawing Sheets

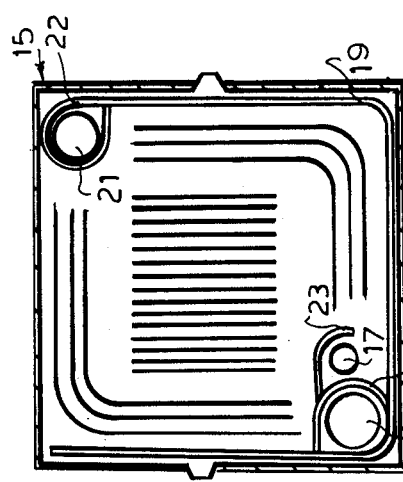
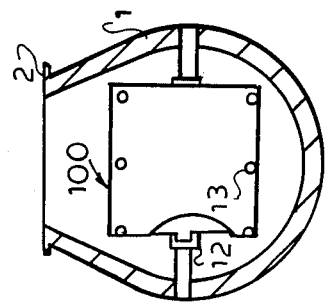
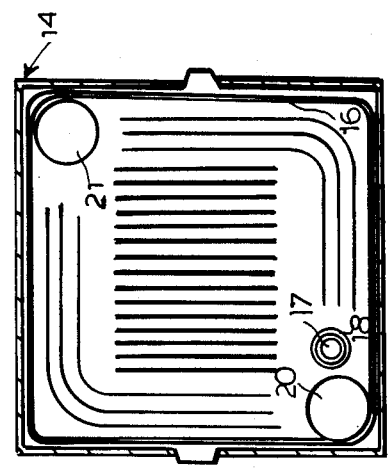
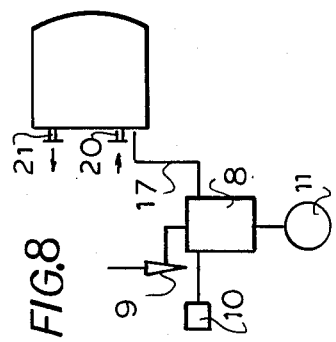
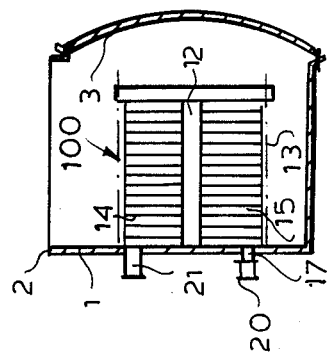

VACUUM CONDENSOR WITH CONDENSATE CATCH

CROSS REFERENCE TO RELATED APPLICATION

This application is a division of Ser. No. 06/935,858 filed Nov. 26, 1986, and now U.S. Pat. No. 4,726,418.

FIELD OF THE INVENTION

This invention relates to a vacuum condensor with a condensate trap for vapors and which is useful in installations where vacuum condensors are used, more particularly, in the chemical industry.

BACKGROUND OF THE INVENTION

A known vacuum pipe-type condensor comprises a housing with a neck forming a vapor inlet, and two pipe grates, fastened to the housing and in the holes of which the pipes are fastened. A deaeration device is connected on both sides of the housing below the horizontal diametral plane. The vapors enter through the neck into the space between the pipes, while the cooling liquid is supplied through the bottom half of the front cover, passes through the lower row of pipes, through the rear space, enters the upper layer of pipes, and leaves the condensor through the top half of the front cover in the case of a two-pass condensor. The condensate is collected in the bottom portion of the housing and is pumped out by a condensate pump.

Another known vacuum plate-type condensor comprises a housing with a neck, in which there is mounted a stack of consecutively alternating plates, for water and vapor spaces, of the same configuration, but with different gaskets. The plates for the water space have a gasket surrounding the entire plate to avoid any leakage of cooling liquid from the stack, and a gasket is provided around the hole for the outflow of condensate. The plates of the vapor space have a gasket surrounding the entire plate except for the top edge, which serves for the inflow of vapors, and two additional gaskets around the holes for the cooling liquid. The condensate is pumped out by a condensate pump through the holes of the plates for condensate. The deaeration device applies suction to the same hole.

These known condensors have the following drawbacks: an irregular thermal loading of the pipes and the plates along their length and array; a loss of vapor via the deaeration device, for the trapping of which additional devices are required; the deaeration device must be of intricate design and consume a large amount of energy.

OBJECT OF THE INVENTION

It is, therefore, a general object of this invention to develop a vacuum condensor with a condensate trap for the vapor produced, by means of which irregular thermal loading of the pipes and the plates can be reduced, loss of condensate via the deaeration device can be halted, the design of the deaeration device can be simplified, and the energy consumed by the latter can be reduced.

SUMMARY OF THE INVENTION

This object is achieved with a vacuum condensor with a condensate trap comprising a horizontal cylindrical housing with a neck; the two bottoms of the housing are closed by covers. Inside the housing there are mounted heat-exchange bodies, while externally to it there are connected a deaeration device and a condensate pump. According to the invention, the heat-exchange bodies are pipes arranged alongside the housing and fastened to it by means of two pipe plates, and over the lowest pipe row there is mounted a diaphragm perforated at its bottom end, to which there is fastened an overflow pipe. The other end of the overflow pipe is attached to a condensate vessel, which is connected in its top part with the deaeration device and a vacuum-regulator, and in its bottom part with a condensate pump.

In a design variant of the condensor, the heat-exchange bodies represent a stack of consecutively alternating plates for the water and the vapor spaces, fastened to the one bottom of the housing by means of bars and stud bolts with respective gaskets. The plates for the vapor space are provided with a barrier gate over the hole of the outlet for condensate. The outlet for condensate is attached to a condensate vessel, which is connected at its upper portion with a deaeration device and a vacuum-regulator, and in its bottom portion with a condensate pump.

The advantages of the device according to the invention are as follows: the irregularity of the thermal loading of the pipes and the plates is reduced; the losses of condensate via the deaerating device are eliminated; the design of the deaeration device is simplified and the energy consumed by it is reduced; and the overcooling of the condensate is avoided.

BRIEF DESCRIPTION OF THE DRAWING

For a better understanding of the invention, reference should be made to the accompanying diagrammatic drawing in which there is illustrated a preferred embodiment of the invention. In the drawing:

FIG. 5 is a cross-sectional view of a vacuum condensor plate for the water space;

FIG. 6 is a cross-sectional view of a vacuum condensor plate for the vapor space;

FIG. 7 is a longitudinal sectional view of the vacuum condensor with plates;

FIG. 8 is a diagram showing the connection of the components of a vacuum condensor with plates; and FIG. 9 is an outside view of the vacuum condensor with plates as seen from the side of the cover.

SPECIFIC DESCRIPTION

Figure 2:
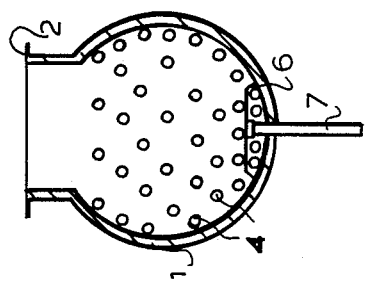
FIG. 2 is a cross-sectional view of the vacuum condensor with pipes.
Figure 4:
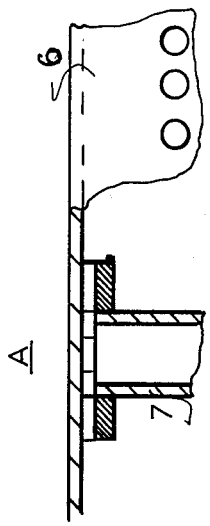
FIG. 4 shows the detail A of FIG. 1.
Figure 1:
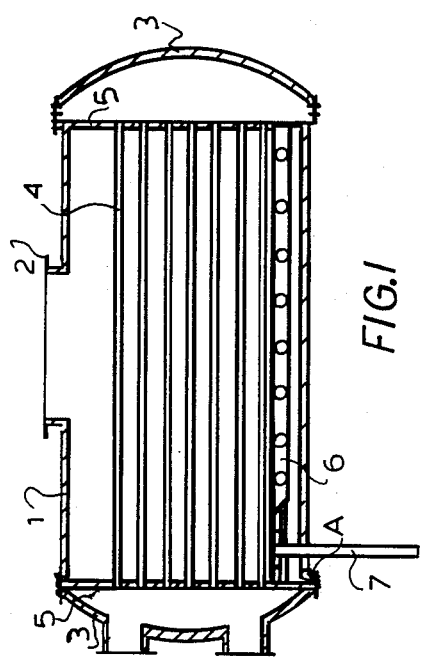
FIG. 1 is a longitudinal sectional view of a vacuum condensor with pipes.
Figure 3:
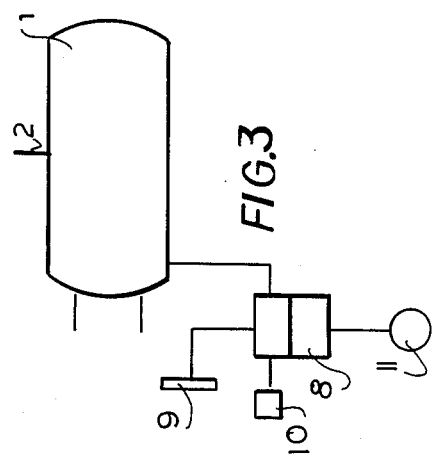
FIG. 3 is a diagram showing the connection of the components of the vacuum condensor with pipes.

The vacuum condensor (FIGS. 1-4) with a condensate trap of the invention consists of a horizontal cylindrical housing 1 with neck 2, the both bottoms of which are closed by covers 3. Inside the housing 1 there are mounted heat-exchange bodies, in the form of pipes 4, disposed alongside the housing 1 and fastened to it by means of two pipe plates or tube sheets 5. Over the lowest row of pipes 4 there is mounted a diaphragm 6 which is perforated in its bottom end, and to it there is fastened an overflow pipe 7 (outlet for the condensate)

which is provided with slots immediately underneath the diaphragm 6. The other end of the overflow pipe 7 is attached to a condensate vessel 8. The top portion of the condensate vessel 8 is connected to the suction side of the deaeration device 9 and to the vacuum-regulator 10. The bottom portion of the condensate vessel 8 is connected to the condensate pump 11 (FIG. 3).

In a design variant of the condensor (FIGS. 5-9), to one of the bottoms of housing 1 (see FIG. 7) there is fastened a stack 100 of consecutively alternating plates 14, 15, respectively with flutes for the water and the vapor spaces. The plates 14 and 15 are of the same configuration, but they differ in the arrangement of gaskets. Along the periphery of the plates 14 for the water space there is provided a gasket 16 which is closed on all sides, while around the outlet for condensate 17 there is mounted an O-ring 18. Along the periphery of the plates 15 for the vapor space there is provided a gasket 19 which is open in its top end; around the holes for inlet 20 and outlet 21 of cooling water there are mounted additional gaskets 22, while over the hole for outlet of the condensate 17 there is provided a barrier gate 23. The outlet for condensate 17 is connected with a condensate vessel 8.

The stack 100 is held together and to the housing by tie rods 13 and is engaged by lateral members 12.

The operation of the vacuum condensor with a condensate trap for the vapors is as follows:

In the case (FIGS. 1-4) when pipes 4 are mounted in the housing 1, the cooling water is supplied in the bottom portion of the one cover 3, it passes through the bottom layer of pipes 4 and through cover 3, it passes through the bottom layer of pipes 4 and through the rear space enters the top layer of pipes 4, and leaves the housing 1 through the top portion of the same cover 3. The vapors which must be condensed enter the space between the pipes through the neck 2 and move towards the holes of diaphragm 6. On their path they come in contact with the pipes 4 and condense. The condensate passes through the holes of diaphragm 6 and flows via the overflow pipe 7 towards the condensate vessel 8, from where it is pumped out by means of the condensate pump 11. The vapor passing through the holes of diaphragm 6 sparge as small bubbles through the condensate trap, which is cooled to a temperature lower than the temperature of condensation of the vapors for the given pressure and condensate. The deaeration device 9 maintains the vacuum in the installation, as preset by the vacuum regulator 10.

When plates 14 and 15 are mounted inside the housing 1 then the cooling water is supplied through the inlet 20, it passes through the water spaces and leaves the condensor through the outlet 21. The vapors pass through the neck 2 and through the top holes of the vapor spaces and condense on the plates. The condensate passes through the slot between the open gasket 19 and the barrier gate 23, and flows through the outlet for condensate 17 towards the condensate vessel 8, from where it is pumped out by the condensate pump 11. The vapors passing through the slot bubble through the condensate trap, which is cooled to a temperature lower than the temperature of condensation of the vapors for the given pressure, and condense. The deaeration device 9 maintains the vacuum in the installation, which is preset by the vacuum regulator 10.

I claim:

1. A vacuum condenser, comprising:
   a generally horizontal housing formed with a pair of horizontally spaced bottoms at opposite ends of the housing and with a vapor inlet between said ends;
   a condenser-plate stack mounted on one of said bottoms and comprising:
      a multiplicity of identical generally rectangular vertical plates defining between them alternating water and vapor compartments, each of said plates having a lower hole, an upper hole, and a condensate outlet located proximal to a bottom edge of the plate, all of said upper holes being horizontally aligned, all of said lower holes being horizontally aligned, and all of said outlets being horizontally aligned,
      first gaskets mounted on the plates defining said vapor compartments along vertical edges and a bottom edge thereof, and around the said holes thereof to bound said vapor compartments along vertical sides and bottoms thereof and isolate said holes from said vapor compartments;
      second gaskets mounted all around edges of said plates bounding said water compartments;
      third gaskets mounted on said plates defining said water compartments and surrounding said outlets in said water compartments , and
      means mounted to said plates defining said vapor compartments and forming a barrier gate overlying said outlets in said vapor compartments and extending downwardly to terminate above a respective bottom of a respective vapor compartment to form a gap therewith traversed by condensate formed in each vapor compartment;
   means connected with said stack for feeding cooling water to said lower holes;
   means connected with said stack for removing water from said upper holes; and
   means connected with said stack for withdrawing said condensate from said outlets.

2. The vacuum condenser defined in claim 1 wherein said means connected with said stack for withdrawing said condensate from said outlets includes:
   a condensate collection vessel connected to said outlets;
   a condensate pump connected to said vessel for withdrawing condensate therefrom; and
   means for generating a vacuum connected to said stack through said vessel.

* * * * *